April 17, 1956 — P. B. WEISZ — 2,742,574
METHOD FOR DETECTION OF HYDROCARBONS
Filed Dec. 12, 1951
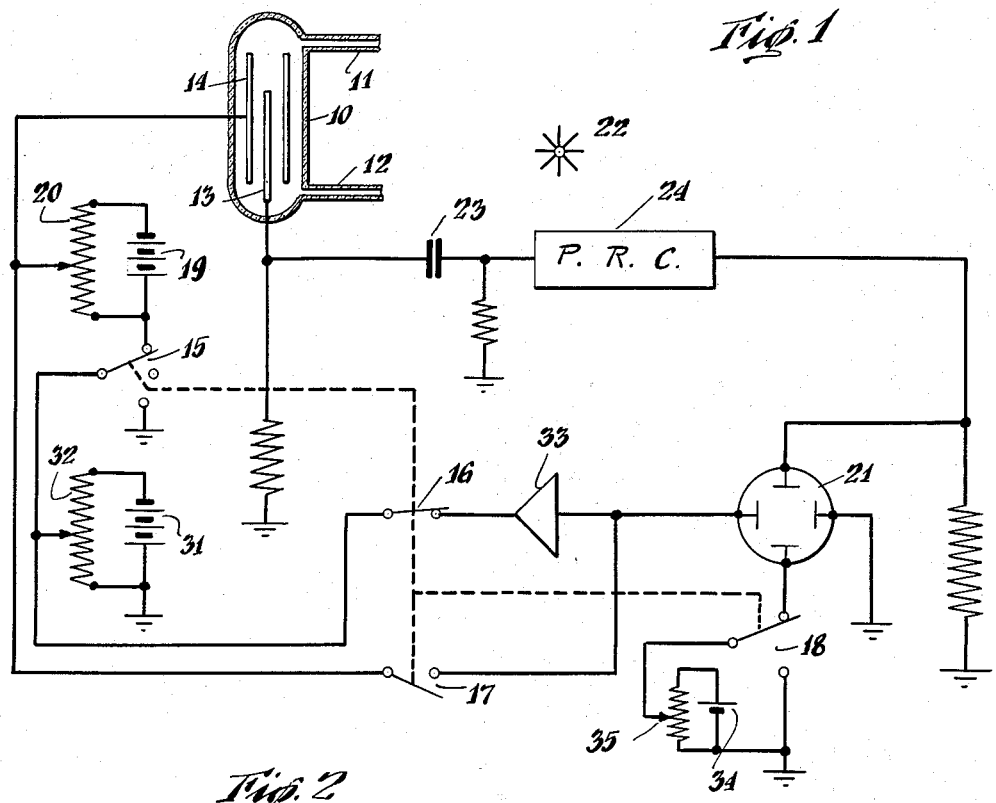
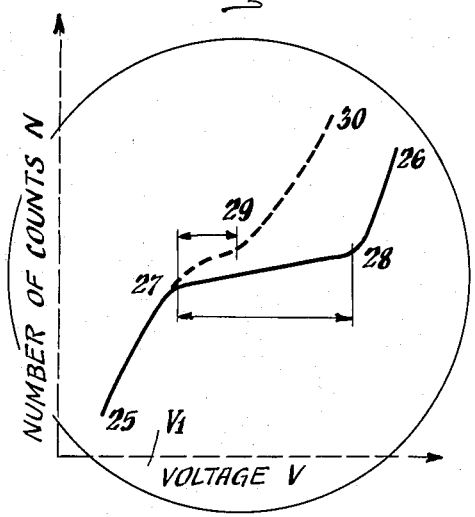
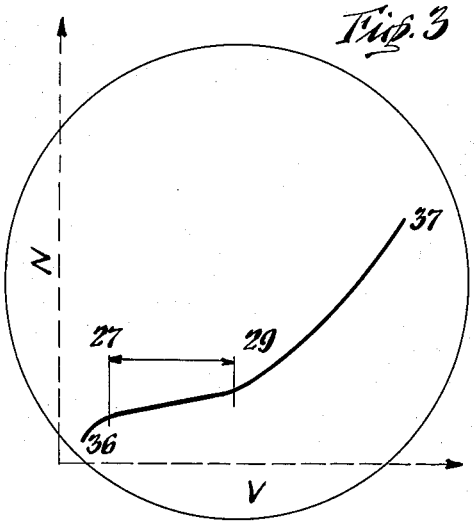
INVENTOR.
Paul B. Weisz
BY
ATTORNEY United States Patent Office 2,742,574
Patented Apr. 17, 1956

2,742,574

METHOD FOR DETECTION OF HYDROCARBONS

Paul B. Weisz, Pitman, N. J., assignor to Socony Mobil Oil Company, Inc., a corporation of New York Application December 12, 1951, Serial No. 261,348

1 Claim. (Cl. 250—43.5)

This invention has to do with methods for the detection of small amounts of hydrocarbons in gas samples containing the same.

In exploration for oil, one method which has received attention is that of collecting soil-gas samples from a series of points distributed in a pattern across the area under examination, followed by analysis of these soil-gas samples for hydrocarbons in an attempt to determine whether or not the area examined has an underlying oil deposit. While many refinements of technique have been worked out in the collection of samples, and their proper correlation with the possible underground deposits, one point of trouble has been the analysis of the samples. Classical methods of analysis have been applied with difficulty. Most methods of suitable accuracy have been "bench" methods, adaptable for application only in a laboratory, usually at some distance from the point of sample collection. Relatively few methods have been developed showing any promise for use at or near the site of sample collection. The most desirable method is one which can be expressed in apparatus combining high portability and accuracy, together with ruggedness, in order that the soil-gas analysis could be conducted in the field, thus avoiding all of the inherent difficulties such as contamination, loss, and others arising from a method which requires taking of samples in the field, transportation to a laboratory, and probably intervening storage prior to analysis.

This invention is directed to a method for such analysis and for accomplishing such method.

It is further directed to a method for the analysis capable of utilizing an apparatus of portable nature, adaptable to field use as well as laboratory use.

The present method is based upon the fundamental proposition that in a Geiger-Muller counter, hydrocarbons of greater than 2 carbon atoms are capable of acting as quenching media, as set forth in my prior United States Patent 2,519,864.

As is well known, a Geiger-Muller counter is a device for the detection of radiation, consisting essentially of a confined body of gas, under low absolute pressure, in which there are mounted two electrodes across which a high field is maintained. When brought near a source of radiation, the arrival of an electron in this field causes a discharge, which may be recorded as a "count." Suitable wiring arrangements for such equipment are well known, as is also the fact that hydrocarbons of 2 or more carbon atoms, as well as other polyatomic gases, will act as "quenchers" in such G–M counters.

To more fully understand this invention, reference is now made to the drawings which are attached to and made a part of this specification.

In these drawings, Figure 1 shows, in highly diagrammatic form, the general arrangement of the apparatus, while Figures 2 and 3 are representations of oscilloscope tracers obtained under described conditions of operation.

Referring now to Figure 1, wherein 10 is a Geiger-Muller counter tube, fed with gas of a desired nature and a desired pressure through 11, which gas passes out through 12, and equipped with electrodes 13 and 14. This counter should be operated in a manner customary for self-quenching operation. Assuming switches 15, 16, 17, 18 to be in positions opposite to those shown in the drawing, we have a rather conventional Geiger-Muller counter setup, as follows: A potential is impressed across 13 and 14 by battery 19 capable of variation by variable resistance 20. The value of this voltage may be transferred, for recording purposes, to the horizontal sweep of an oscilloscope in conventional manner through switch 17, in the closed position. When an electron, originating in an adjacent source of radiation 22 enters chamber 10, the pulse resulting therefrom, passing through condenser 23 and a pulse rate counter circuit 24 of conventional nature, may be impressed upon the vertical sweep of oscilloscope 21 in conventional manner, switch 18 being closed directly to ground.

Now if variable resistance 20 be varied in regular manner, as for example by a continuous speed drive of known sort, the trace upon the face of oscilloscope 21 will be N, the number of counts per interval of time (time being preselected within the counter circuit 24 in known manner), upon a vertical scale, against voltage upon a horizontal scale. The shape of the curve trace so drawn is dependent in great measure upon the nature of the gas mixture in chamber 10.

Turning to Figure 2, if a conventional mixture of say 8 parts argon and 1 part oxygen at a pressure of 5 to 10 centimeters of mercury (absolute) or of 5 parts argon and 1 part xylol, at similar pressure, or of any other mixture known to the art as being an appropriate mixture of argon and a quenching medium is fed to chamber 10, the trace will be as shown at 25—26. For this trace, as indicated, voltage across the G. M. tube is the horizontal scale, increasing to the right, as indicated, and number of counts per selected time interval is the vertical scale, increasing upwardly. The trace 25—26 shows a region 25—27 where as voltage is increased, the counts increase proportionately, a "plateau" 27—28 where the number of counts remains relatively constant across a range of increasing voltage, and a range 28—26 where counts increase again, passing toward continuous discharge, the upper limit of voltage V preferably being selected such that this condition will not be reached. Now, if, instead of the standard sort of mixture, a mixture of argon and soil gas, containing a small amount of ethane be introduced to chamber 10, a trace such as 25—27—29—30 would be gotten (shown dotted for clarity). The "plateau" at 27—29 will result from the hydrocarbon, and its nature, i. e., its length horizontally in terms of voltage and vertically in terms of N will depend upon the amount of hydrocarbon present. It may be quite small upon a trace of normal "size" and consequently quite hard to detect. It may be rendered more capable of detection and study by effecting appropriate scale changes in the oscilloscope, in the following manner:

Returning to Figure 1, this will be accomplished by operating resistance 20 manually and setting it at a voltage $V_1$, corresponding to some point near or below the beginning 27, of the suspected plateau 27—29 (for V, 27, 29 see Figure 2). Then switches 15, 16, 17, 18 are brought to the positions shown. Now we have added to that voltage secured by setting of resistor 20, a voltage derived from battery 31 and controlled by variable resistor 32. Voltage sources 19 and 31 are so selected that while 19 is capable of giving the entire range of voltage desired for operation of the counter, source 31 gives only that range desirable for examination of the plateau. Source 19, for example, might be 2000 volts, and source 31 would be 200 volts. Now variable resistor 32 is operated over its range at constant speed, as by a motor drive. This voltage being led through closed switch 16 to the horizontal sweep of oscillator 21. Amplifier 33, a voltage amplification circuit of any conventional character, in this voltage divider to oscilloscope circuit, serves to multiply the horizontal or V scale for the oscilloscope trace. Amplifier 33 may be fixed or variable. If it is so selected as to have a gain ratio the same as the ratio between voltage sources 19 and 31, the expanded horizontal scale will occupy the same actual horizontal distance upon the screen as did the base scale. Obviously, if adjustable, greater or less magnification may be had and this, together with the preselected manual setting of voltage divider 20 will permit detailed examination of any portion of the oscilloscope trace. As to the vertical scale of the oscilloscope trace, no magnification is necessary, but it may be desirable to be able to reset the position of the trace upon the oscilloscope screen so that the point 27 (see Figure 2) is near the bottom of the screen. If this is desired, with switch 18 in the position shown in Figure 1, we have a voltage source 34 and a voltage divider 35, reverse in polarity to the impulse coming from pulse rate counting circuit 24, which may be used to oppose (subtract) a sufficient amount of that impulse to lower the position of point 27 upon the screen.

With these adjustments made, we have a trace as shown in Figure 3, at 36—37 in which the plateau present on the first trace at 27—29 is magnified (ten times in the exemplary set up) in horizontal dimension, and rendered far more detectable.

The course of operation to be followed is basically one of comparison of oscilloscope traces. A trace for a base condition will be compared with a trace for a soil gas sample. The comparison may be visual, or the traces may be photographed, or any of the usual, known, methods for handling data drawn from oscilloscope traces may be used.

The sensitivity of the arrangement is such that hydrocarbons of $C_2$ or greater will be detectable if present in amounts as little as one part in $10^7$.

Now to the method in more detail. The first step will be to operate with argon alone to get a basic trace, which will have no plateau. Then operate with a mixture of argon and soil gas. If a "plateau" appears or is suspected, the scale shifting and scale magnification arrangements are used, as desired, for its study. In many cases, the basic trace may be produced by use of argon mixed with an appropriate known quencher. In such case, to minimize purging difficulties taking the basic trace after examination of the samples is advisable. In many cases, after a given apparatus has been set up and gotten into settled operation, the frequent taking of basic traces may prove unnecessary.

The relative concentration of argon and sample gas in the tube atmosphere may be varied as desired for sensitivity. Normally it will be of the order of from 1 to 50 parts (volume) of sample with 99 to 50 parts of argon. Otherwise, normal conditions of self-quenching GM tube operation will be practised, the absolute pressure in the tube being dependent upon the available voltage across the tube elements, as is well known. It will be understood, however, that I consider operating at pressures up to and including atmospheric pressure as within the scope of my invention, such operation sometimes being advisable for the increase of sensitivity.

In the interpretation of results, it will be noted that when a plateau appears, it indicates the presence of a quencher, and that the length and slope of the plateau are indicative of its concentration. So, by use of suitable prepared samples for basic data, the method may be used to furnish not only knowledge of the presence of $C_2$ and heavier hydrocarbons, but also to get a fair estimate of their concentration.

I claim:

A method of geophysical prospecting for investigating and evaluating the possibility of petroliferous deposits in underlying earth strata which includes the steps of collecting a soil gas sample from an underlying stratum to be investigated, mixing the collected sample with a portion of a gaseous medium known to have non-quenching characteristics when placed in a Geiger counter, subjecting another portion of the gaseous medium mixed with a gas having known quenching characteristics to conditions simulating that of a Geiger counter, deriving an output from the Geiger counter indicative of the voltage and counts relationship in the output of the Geiger counter, visually displaying the voltage versus counts curve of the output of the Geiger counter, said curve being characterized by a definite plateau, recording the visual display and preserving same for subsequent use as a reference, subjecting the mixture of soil gas and gaseous medium to conditions simulating that of a Geiger counter, deriving an output from the Geiger counter indicative of the voltage and counts relationship in the output of the Geiger counter, visually displaying the voltage versus counts curve of the output of the Geiger counter, detecting the presence of a plateau in the second mentioned curve by reference to the record of the first-mentioned curve, magnifying for visual inspection the second mentioned curve in the region of any plateau, and deriving from the slope and length of any magnified plateau of the second mentioned curve an indication of the presence of hydrocarbons of at least two carbon atoms and their concentration.

References Cited in the file of this patent
UNITED STATES PATENTS

| | | |
|---|---|---|
| 2,437,323 | Heigl et al. | Mar. 9, 1948 |
| 2,559,688 | Touvet | July 10, 1951 |

OTHER REFERENCES

"Use of a Grid to Reduce Operating Voltage in Geiger-Mueller Counters," by L. A. Korff and W. E. Ramsey, Rev. of Sci. Instruments, August 1940, vol. 11, No. 8, pp. 267–269.

"Self-Quenching Halogen-Filled Counters," by S. H. Liebson and H. Friedman, Rev. of Sci. Instruments, vol. 19, No. 5, May 1948, pp. 303–306.

"Electron and Nuclear Counters," by S. A. Korff; copyright 1946 by D. Van Nostrand Co., p. 90.